Patented Sept. 1, 1942

2,294,761

UNITED STATES PATENT OFFICE 2,294,761

PROCESS FOR COATING METAL SURFACES

William C. Morris, North Chicago, Ill., assignor to Poor & Company, Chicago, Ill., a corporation of Delaware No Drawing. Application July 20, 1940, Serial No. 346,667

4 Claims. (Cl. 106—48)

This invention relates to a process of coating metallic surfaces, particularly iron and steel surfaces, and has for its primary object the use of a novel bonding compound or material acting to effectively bond a vitreous or enamel coating to a ferrous metal surface upon heating the properly prepared and coated metal to the maturing temperature of the applied glass or "frit." To that end the invention is particularly applicable to high firing enamels, fusing in the temperature range of approximately 1460° F. to 1620° F. and as distinguished from the use of bonding agents employed in bond dip solutions and inconventional blue or cobalt ground coats, the present invention contemplates a novel bonding compound or material which functions as a mill addition to the glass or frit composition.

Accordingly, the essential feature of the present invention resides in the use of pure antimony trioxide ($Sb_2O_3$) combined with a thermally stable rare earth phosphate, and this trioxide of antimony preferably is prepared from commercially available tetroxide by known processes which separate or remove all sulfur, arsenic and pentavalent antimony, leaving only the pure and true trivalent antimony oxide.

The rare earth phosphate which is combined with the pure antimony trioxide to form the bonding material or compound, as indicated, must be thermally stable, as well as compatible with both the milled slip and the fired enamel, at the same time must contain no objectionable impurities, such principally, as iron, lead, arsenic and sulfur. A suitable rare earth phosphate, such as required by the present invention, which has been and is being used successfully by me has the following composition, to wit:

| | Parts by weight |
|---|---|
| Thorium oxide | 9.5% |
| Cerium oxide | 30.0 |
| Didymium oxide | 15.0 |
| Lanthanum oxide | 15.0 |
| Phosphorous pentoxide | 30.0 |

In preparing the said bonding material of the antimony trioxide combined with the said rare earth phosphate the same is used in the ratio of one part of antimony trioxide to 0.02 to four parts of the rare earth phosphate, preferably 0.25 to 0.50 part of the phosphate. These materials are blended in the desired ratio and then premilled in water with one and one-half percent of the mixture weight in a hydrated titanium oxide gel until there is no residue left on a 325 mesh screen. After milling to the desired fineness the material is desiccated and is then ready for use.

The bonding material as thus prepared is designed to be used in conjunction with a white or grey enamel of the ground coat type but containing no cobalt, manganese, copper or nickel oxide. The bonding material is used in the mill in the ratio of one-half to three parts of the bonding material to one hundred parts of frit by weight. This is added to the mill in addition to the other materials used in the mill, the preferred range being three-fourths to one and one-fourth parts per one hundred parts of frit. The exact amount used will vary with the glass, steel, furnace conditions and other mill additions. It has been found that by using a ground coat type glass containing no metallic oxides, bond equal to or better than the cobalt ground coat bond can be obtained at lower cost, and that a full-finish ware can be obtained with one less coat of enamel thus giving a double saving in the cost of the ware.

A typical frit formula that can be used with the bonding material described above is as follows:

| | Parts by weight |
|---|---|
| Borax | 31.8 |
| Feldspar | 29.5 |
| Silica | 20.1 |
| Fluorspar | 4.1 |
| Soda ash | 9.0 |
| Soda nitrate | 5.5 |

This material is blended, smelted, and fritted in the usual way.

To produce a grey or grey-white ground coat the following mill additions are used to make the complete coating material:

| | Parts by weight |
|---|---|
| Frit | 100 |
| Clay | 7 |
| Silica | 2 |
| Bonding material | 1.25 |
| Soda nitrite | 0.125 |
| Opacifier (optional) | 6 |
| Water | 42 |

This complete coating material formula is milled to the fineness of 0 to 25% residue on a 200 mesh screen, usually to 4 to 9% residue, and is then sprayed, slushed or dipped on the properly prepared ferrous metal surface to the desired weight or thickness, usually one to two ounces per square foot of metal. After drying this coated metal article, the same is fired to the maturing temperature of the glass, which should be in the temperature range of 1460° F. to 1620° F., preferably between 1540° F. to 1560° F.

With reference to the general action involved in connection with the foregoing procedure it should be noted that as the temperature of firing an enamel on a ferrous metal surface is increased, the amount of thermally produced iron oxide also increases, and the ratio of high valent (ferric) iron oxide to low valent (ferrous) iron oxide also increased. With the present invention, however, the bonding material or agent, described above, operates to control the amount of iron oxide and the nature of the oxide produced, and by means of this aids and controls the bonding of the glass to the ferrous metal surface. For this reason the new bonding material or agent must, in addition to being compatible with the glass, be more reducing or less oxidizing in nature than a bonding agent for use with a lower firing glass or enamel. The lower valent iron oxides are more easily fluxed by or dissolved in the glass melt and make the glass less brittle than the higher valent iron oxides. Also the lower valent thermally produced iron oxides are more strongly bonded to the ferrous metal surface, and by operating to control the nature and amount of iron oxide thermally produced, control the bonding of the glass to the metal surface.

From the foregoing it is thought that the invention disclosed herein will be readily apparent to those skilled in the art without further description and it will be understood that nonessential changes or variations can be made without departing from the spirit of the invention as defined in the appended claims.

I claim:

1. A process of preparing a self-bonding glass or enamel composition for use in enamel-coating processes which consists in preparing a glass frit having a maturing temperature range between 1460° F. to 1620° F., reducing the said frit to a milled slip, separately premilling a mix containing antimony trioxide blended with a thermally stable rare earth phosphate, and incorporating this premilled mix in said frit as a mill addition thereof.

2. A process of preparing a self-bonding glass or enamel composition for use in enamel-coating processes which consists in preparing a glass frit having a maturing temperature range between 1460° F. to 1620° F., reducing the said frit to a milled slip, separately preparing a mix of antimony trioxide and rare earth phosphate premilled in a hydrated titanium oxide gel, and incorporating the said premilled mix in the glass frit as a mill addition thereof.

3. A process of preparing a self-bonding glass or enamel composition for use in enamel-coating processes which consists in preparing a glass frit having a maturing temperature range between 1460° F. and 1620° F., reducing the said frit to a milled slip, separately premilling a mix containing antimony trioxide blended with thorium oxide, cerium oxide, didymium oxide, lanthanum oxide and phosphorous pentoxide, and incorporating this premilled mix in said frit as a mill addition thereof.

4. In the process of enamel-coating ferrous metals, the new step of applying to the metal sheet a self-bonding milled slip containing a glass or enamel compound having a maturing temperature range between 1460° F. and 1620° F., and pure antimony trioxide blended with a rare earth phosphate and titanium oxide.

WILLIAM C. MORRIS.